PIERCE W. YARRELL.
Anti-Friction Journals.

No. 110323

Patented Dec 20 1870

Witnesses:
W. H. Finckel
J. L. Norris

Inventor:
Pierce W. Yarrell
by Biedersheim & Harris
Attys.

United States Patent Office.

PIERCE W. YARRELL, OF LITTLETON, NORTH CAROLINA.

Letters Patent No. 110,323, dated December 20, 1870.

IMPROVEMENT IN ANTI-FRICTION JOURNALS.

The Schedule referred to in these Letters Patent and making part of the same.

*To all whom it may concern:*

Be it known that I, PIERCE W. YARREL, of Littleton, in the county of Halifax and State of North Carolina, have invented a new and useful Improvement in Anti-Friction Journals; and I do hereby declare the following to be a clear and exact description thereof, sufficient to enable others skilled in the art to which my invention appertains to make and use the same, reference being had to the accompanying drawing forming part of this specification, in which—

Figure 1:
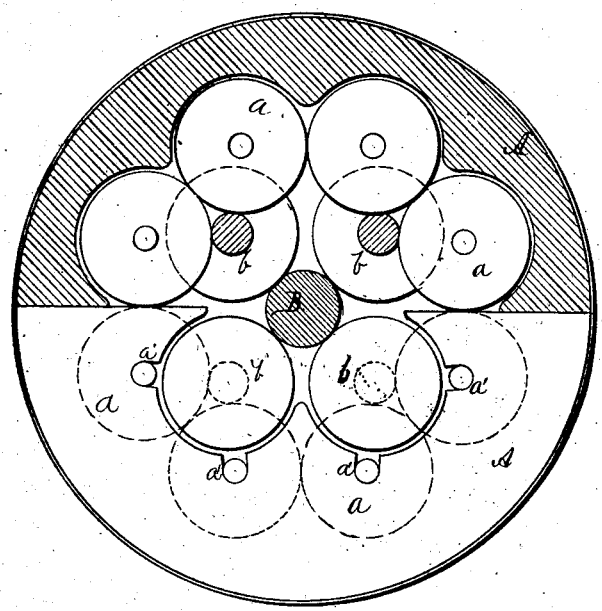
Figure 1 is a side elevation of my device, partly in section.
Figure 2:
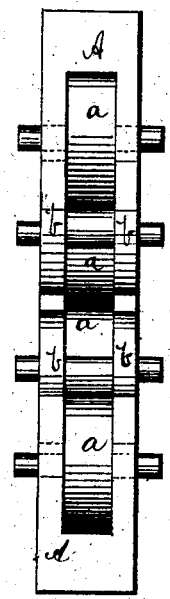
Figure 2 is a front elevation of a half of the same.
Figure 3:
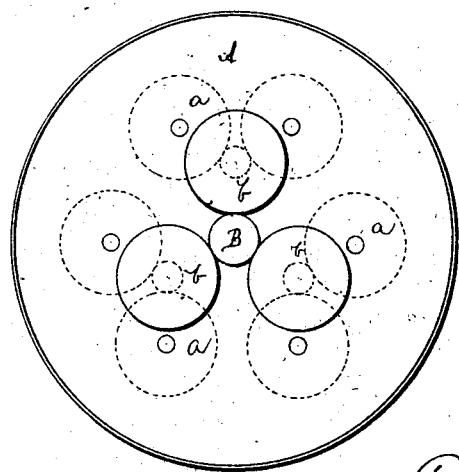
Figure 3 is a modified form of fig. 1.

Nature of Invention.

My present invention relates to an improvement on my patent of March 29, 1870, No. 101,401, and consists in arranging, in a suitable circular casing, a series of single wheels or rollers and a series of double wheels or rollers, in such a manner that the shaft, axle, or journal is surrounded by the double wheels, and the pressure or friction distributed over a large surface, so that all or nearly all is overcome or equalized.

In the drawing—

A A is the box or casing, made of any suitable material, and forming bearings $a'$ $a'$ for the journals of eight (more or less) single wheels, $a$ $a$, the peripheries of which bear against the axles of four (more or less) double wheels, $b$ $b$, substantially as shown, the several wheels being constructed in the same manner as in my former patent, the difference being this, that the wheels are arranged in a circle and entirely surround the shaft, axle, or journal B, so that it is impossible for the said shaft, axle, or journal to slip or jump out, or to become otherwise disengaged therefrom—a difficulty experienced in my other invention.

The box or casing A is made preferably in two equal parts, with recessed interiors, in which the wheels revolve, and, as before said, bearings or boxes $a'$ may be and preferably are formed in the casing, the peripheries of the wheels $a$ forming bearings for the double wheels $b$ $b$.

When the wheels have been properly placed in the box or casing A the two parts are united by means of a band, rim, tire, or other suitable device.

The case may cover all the wheels or may leave the double wheels exposed.

In operation the same manner of distributing the friction or "slip" over a large surface is observed, as in my former patent, the pressure of the shaft being borne equally by double and single wheels, and thus relieving the shaft, axle, or journal.

Having thus described my invention,

What I claim as new, and desire to secure by Letters Patent, is—

1. The arrangement, within a hollow or recessed casing, A, of a series of single wheels, $a$ $a$, and a series of double wheels, $b$ $b$, arranged and operating around the circumference of the shaft or journal, substantially as set forth.

2. The arrangement, within a casing, A, of a series of single wheels, $a$ $a$, and a series of double wheels, $b$ $b$, the wheels $a$ $a$ having bearings or boxes in the casing A, and the wheels $b$ $b$ their bearings on the peripheries of the wheels $a$, arranged and operating around the circumference of the shaft or journal, substantially as and for the purpose set forth.

To the above I have signed my name this 27th day of May, 1870.

P. W. YARRELL.

Witnesses:
JAMES L. NORRIS,
JOHN A. WIEDERSHEIM.